C. H. ARCHIBALD.
MASSAGE APPLIANCE.
APPLICATION FILED NOV. 11, 1912.

1,111,427.

Patented Sept. 22, 1914.

Witnesses
Frances Mae McLaury
Milton Jester

Inventor
Cora Hume Archibald
By V. F. Randolph, Jr.
Attorney

UNITED STATES PATENT OFFICE.

CORA HUME ARCHIBALD, OF EAST LAS VEGAS, NEW MEXICO.

MASSAGE APPLIANCE.

1,111,427.  Specification of Letters Patent.  Patented Sept. 22, 1914.

Application filed November 11, 1912. Serial No. 730,709.

*To all whom it may concern:*

Be it known that I, CORA HUME ARCHIBALD, a citizen of the United States, residing at East Las Vegas, in the county of San Miguel and State of New Mexico, have invented certain new and useful Improvements in Massage Appliances, of which the following is a specification.

This invention comprehends certain new and useful improvements in massage appliances and relates more particularly to those which are formed of some non-yielding material such as glass.

The primary object of the invention resides in the provision of a massage appliance of this nature formed preferably of glass, and having a plurality of projections or protuberances formed on its surface.

The invention also aims to provide a cylindrical applicator adapted to be rolled over the body of the person under treatment, and having its surface studded with a plurality of novelly formed projections.

With these and other objects in view, as will become more apparent as the description proceeds, the invention consists in certain novel features of construction, combination and arrangement of parts, as I shall hereinafter fully describe and claim.

Figure 1:
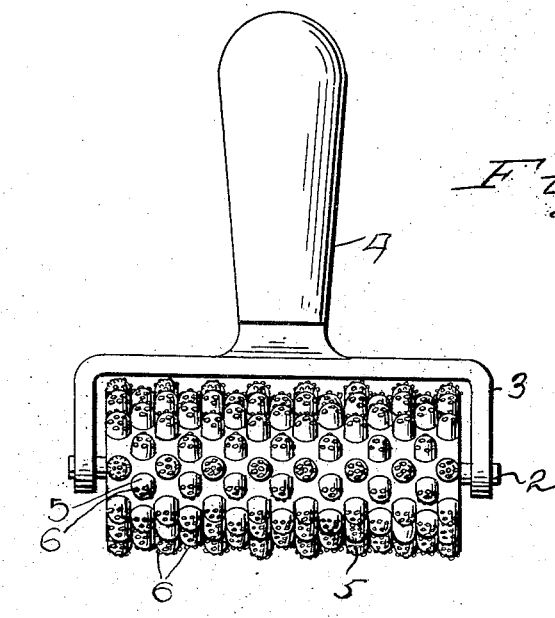
Figure 2:
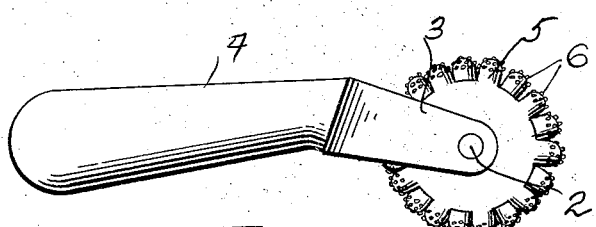
Figure 3:
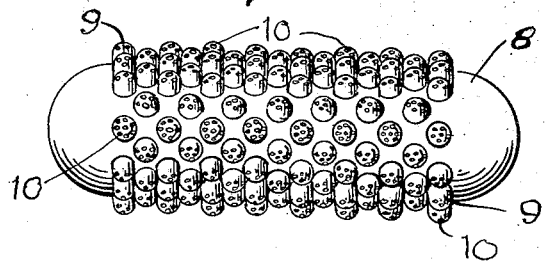

For a complete understanding of my invention, reference is to be had to the following description and accompanying drawing, in which, Figure 1 is a top plan view of one form of my invention showing the same provided with a handle. Fig. 2 is a side elevation of the form shown in Fig. 1. Fig. 3 is a side elevation showing a solid cylindrical appliance with a modified form of protuberances.

In the preferred embodiment of my invention I provide a cylindrical roller, preferably formed of glass and having the trunnions 2 carried upon the ends thereof. The roller 1 is mounted for revolution in the U-shaped frame 3 to which is secured a handle 4. The periphery of the roller 1 is provided with a plurality of protuberances 5 arranged in staggered relationship. Upon reference to Fig. 2 of the drawing it will be seen that these protuberances are of considerable length and have their extremities rounded, whereby the deep underlying tissues of the body may be stimulated without fear of injuring the skin.

In order that the protuberances 5 may better increase the circulation of the blood and stimulate the various tissues which underlie the skin, I preferably form upon their peripheries a plurality of small rounded projections 6, which are clearly shown in the drawings.

In Fig. 3 I have shown a modified form of my device, wherein the frame and handle have been omitted and the ends of the body rounded. In this figure, the cylinder has formed upon its surface the protuberances 9 having a plurality of semi-spherical depressions 10, as clearly shown in Fig. 3. It has been found that in some cases these forms of protuberances operate to a better advantage than the form previously described.

From the foregoing description taken in connection with the accompanying drawings, it will be seen that I have provided an applicator which may be rolled over the surface of the body to stimulate the circulation and invigorate the muscles and tissues underlying the skin.

It will be understood that while I have described the preferred forms of my invention, I do not wish to be limited to these alone, but may shape the body of the device in any desired form and mount it as found most convenient and practical.

I claim:

1. A massage appliance comprising a body formed of a non-yielding substance, and a plurality of non-yielding protuberances formed upon the surface of said body, said protuberances being formed with an uneven surface.

2. A massage appliance comprising a body formed of a non-yielding substance, and a plurality of non-yielding semispherically shaped protuberances formed upon the surface of said body, said protuberances being provided with a plurality of small rounded projections.

In testimony whereof I affix my signature in presence of two witnesses.

CORA HUME ARCHIBALD.

Witnesses:
 JNO. R. KIRK,
 Mrs. ARTHUR BUCK.

---

Copies of this patent may be obtained for five cents each, by addressing the "Commissioner of Patents, Washington, D. C."